United States Patent
Kalte et al.

(10) Patent No.: US 11,017,141 B2
(45) Date of Patent: May 25, 2021

(54) METHOD FOR TROUBLESHOOTING THE PROGRAM LOGIC OF A SYSTEM OF DISTRIBUTED PROGAMMABLE GATE ARRAYS

(71) Applicant: dSPACE digital signal processing and control engineering GmbH, Paderborn (DE)

(72) Inventors: Heiko Kalte, Paderborn (DE); Dominik Lubeley, Paderborn (DE); Marc Schlenger, Paderborn (DE)

(73) Assignee: dSPACE digital signal processing and control engineering GmbH, Paderborn (DE)

( * ) Notice: Subject to any disclaimer, the term of this patent is extended or adjusted under 35 U.S.C. 154(b) by 0 days.

(21) Appl. No.: 16/874,224

(22) Filed: May 14, 2020

(65) Prior Publication Data
US 2020/0364392 A1    Nov. 19, 2020

(30) Foreign Application Priority Data
May 14, 2019 (EP) .................................... 19174383

(51) Int. Cl.
*G06F 30/38*   (2020.01)
*G06F 30/34*   (2020.01)
*G06F 115/02*  (2020.01)
*G06F 117/02*  (2020.01)

(52) U.S. Cl.
CPC .............. *G06F 30/34* (2020.01); *G06F 30/38* (2020.01); *G06F 2115/02* (2020.01); *G06F 2117/02* (2020.01)

(58) Field of Classification Search
CPC ...... G06F 30/34; G06F 30/38; G06F 2115/02; G06F 2117/02
See application file for complete search history.

(56) References Cited

U.S. PATENT DOCUMENTS 8,271,911 B1 * 9/2012 Donlin .................... G06F 30/34
716/100
8,686,753 B1 * 4/2014 Herrmann ........ G01R 31/31705
326/39

OTHER PUBLICATIONS

Extended European Search Report for European Application No. 19174383.0 dated Nov. 25, 2019 with English translation.
(Continued)

*Primary Examiner* — Nghia M Doan
(74) *Attorney, Agent, or Firm* — Muncy, Geissler Olds & Lowe, P.C.

(57) ABSTRACT

A method for troubleshooting the program logic of a computer system. A first logic circuit and a first monitoring circuit, which is communicatively isolated from it, are programmed on a first programmable gate array of the computer system. A second logic circuit and a second monitoring circuit, which is communicatively isolated from it, are programmed on a second programmable gate array of the computer system. After an error has been detected in the program logic of the computer system, a first signal line, which applies a signal from the first logic circuit to a first signal input of the first monitoring circuit, is programmed in the first programmable gate array without changing the first logic circuit, and a second signal line, which applies a signal from the second logic circuit, is programmed in the second programmable gate array without changing the second logic circuit.

12 Claims, 3 Drawing Sheets

(56) References Cited

OTHER PUBLICATIONS

Graham et al., "Instrumenting Bitstreams for Debugging FPGA Circuits," $9^{th}$ Annual IEEE Symposium on Field-Programmable Custom Computing Machines (FCCM01), pp. 41-50 (Apr. 29, 2001).
Neal Stollon, "Multiprocessor Debugging," in On-Chip Instrumentation, Spriger US, Boston, MA, pp. 109-119 (Oct. 23, 2010).
Lim et al., "FlockLab: A Testbed for Distributed Synchronized Tracing and Profiling of Wireless Embedded Systems," ACM/IEEE Int'l Conf on Info Proc. in Sensor Networks, pp. 153-165 (Apr. 8, 2013).
XLINX, "Vivado Design Suite Tutorial: Implementation," v. 2018. 2, pp. 1-118 (Jun. 6, 2018).

* cited by examiner

METHOD FOR TROUBLESHOOTING THE PROGRAM LOGIC OF A SYSTEM OF DISTRIBUTED PROGAMMABLE GATE ARRAYS

This nonprovisional application claims priority under 35 U.S.C. § 119(a) to European Patent Application No. 19174383.0, which was filed in Europe on May 14, 2019, and which is herein incorporated by reference.

BACKGROUND OF THE INVENTION

Field of the Invention

The present invention relates to the debugging of distributed computer systems.

Description of the Background Art

Distributed computer systems are characterized by the fact that they comprise at least two computing units, which are spatially separated but interconnected by data communication, in order to realize a higher computing power by distributing the computing load to the existing computing units than a single computing unit could provide. A simple example is a commercial PC with a graphics card on which a graphics processor is installed, which in order to relieve the main processor takes over the computation of the image to be displayed on the monitor. However, the state of the art also comprises more complex computer systems with a large number of computing units operating in parallel. One example is hardware-in-the-loop simulators (HILs) for emulating a working environment of an electronic control unit (ECU). These are used to test and develop control units in a largely virtual environment without risk and under reproducible conditions.

In addition to command-based processors, programmable gate arrays are also common as the computing units used. These are generally characterized by a large number of logic units, each comprising one or more logic gates whose functionality and interconnection can be changed by programming. Commercial programmable gate arrays, in particular FPGAs (field programmable gate arrays), in addition to the logic units, also comprise other resources which, like the logic units, can be interconnected and integrated into the program logic, for example, RAM blocks, registers, or integrated signal processors.

A particular advantage of programmable gate arrays is their ability to perform many arithmetic or logic operations in parallel on a single computing unit. The most complex and therefore most powerful programmable gate arrays in the current state of the art are FPGAs. Other examples are CPLDs (complex programmable logic devices) and PALs (programmable array logics).

If an error occurs in the program logic of an actually completely setup distributed computer system, then the search for it is a time-consuming task because the system must generally be considered in its entirety. Because the computing units work in parallel and exchange data, the cause of an error occurring in one computing unit can be in another computing unit. The read accesses performed to investigate the error must be time-synchronized between the computing units in order to be able to relate the read-out values in a meaningful way to one another.

Troubleshooting is even more complex if the distributed system comprises computing units in the form of programmable gate arrays, because their program logic is not based on an iterative processing of machine commands but is hard-wired in the form of an integrated circuit. The currently common approach is to subsequently program a monitoring circuit, a so-called debug core, on a programmable gate array in which an error is suspected. However, its subsequent programming requires a recalculation of the entire design of the programmable gate array, which not only takes much time but can also influence the reproducibility of the error. In addition, reprogramming also resets the state of the program logic programmed on the gate array. In the case of a rarely occurring error, this can mean that one has to wait a long time for the error to reoccur.

In summary, troubleshooting in the program logic of distributed systems of programmable gate arrays often leads to long downtimes and a high human resource commitment. Against this background, the object of the invention is to simplify the troubleshooting in such systems.

A test tool for parallel, synchronized troubleshooting in distributed computer systems is known from the article "FlockLab: A testbed for distributed, synchronized tracing and profiling of wireless embedded systems" by Roman Lim et al., ACM/IEEE International Conference on Information Processing in Sensor Networks (2013).

Paul Graham et al. in their article "Instrumenting Bitstreams for Debugging FPGA Circuits," Proceedings of the $9^{th}$ Annual IEEE Symposium on Field-Programmable Custom Computing Machines (2001), propose the preinstallation of a monitoring circuit on an FPGA, in order to analyze the program logic of the FPGA in the case of error by means of post-implemented lines.

SUMMARY OF THE INVENTION

It is therefore an object of the present invention to provide a method for troubleshooting the program logic of a computer system, which comprises at least one first and second programmable gate array. The method first comprises the method steps of programming a first logic circuit on the first programmable gate array and programming a second logic circuit on the second programmable gate array.

As an introduction to the further description of the method, some terms used in the present description are explained below.

A netlist is information that defines the resources of the programmable gate array, which are used for a program logic to be loaded onto a programmable gate array, and the electrical interconnections of the resources used. The program logic can be derived from a netlist, but it contains no information about the spatial position of the resources listed therein and no information about the spatial course of the electrical connections between the resources.

A design is information that defines the spatial position of the resources, listed in a netlist, and the spatial course of the electrical connections, defined in the netlist, on a programmable gate array.

The term programming in the present application basically and exclusively refers to the inputting of a bitstream into a programmable gate array for setting up the programmable gate array according to the specifications of a design. "Programming with X," where X is a placeholder for any entity that can be set up on a programmable gate array by programming, in particular a logic circuit, a monitoring circuit, a signal line, or a trigger signal line, refers to a setting up of the entity on the programmable gate array by programming.

In addition to the first logic circuit, a first monitoring circuit, by means of which signals can be read out from the first logic circuit in the event of an error, is programmed on the first programmable gate array. The first monitoring circuit comprises a first signal input and a first trigger signal input and is set up to read out and store a signal value of a signal present at the first signal input as a result of a trigger signal present at the first trigger signal input. First, however, the first monitoring circuit is communicatively isolated from the first logic circuit; i.e., the design of the first programmable gate array does not comprise any signal lines between the first logic circuit and the monitoring circuit, so that no exchange of signals between the first logic circuit and the first monitoring circuit is possible.

Analogously, in addition to the second logic circuit, a second monitoring circuit is programmed on the second programmable gate array, said monitoring circuit by means of which signals can be read out from the second logic circuit in the event of an error, but which is initially communicatively isolated from the second logic circuit. The second monitoring circuit comprises a second signal input and a second trigger signal input and is set up to read out and store a signal value of a signal present at the second signal input as a result of a trigger signal present at the second trigger signal input.

After an error in the program logic of the computer system is detected, it is provided according to the invention, without changing the first logic circuit, to program a first signal line, which applies a signal from the first logic circuit to the first signal input, in the first programmable gate array without changing the first logic circuit. In the same way, the programming of a second signal line, which applies a signal from the second logic circuit to the second signal input, is provided in the second programmable gate array without changing the second logic circuit.

After programming of the first signal line and the second signal line, signals from the first and second logic circuit are present both at the first and second monitoring circuit, which signals can be read out by the respective monitoring circuit to analyze an error in the program logic of the computer system.

Finally, a first trigger signal present at the first trigger signal input is generated, which causes the first monitoring circuit to read out and store a first signal value from the first signal input, and a second trigger signal present at the second trigger signal input is generated, which causes the second monitoring circuit to read out and store a second signal value from the second signal input synchronized in time with the reading out of the first signal value by the first monitoring circuit.

The method of the invention solves the aforementioned problems in connection with the debugging of distributed systems of programmable gate arrays and thereby brings about a substantial cost reduction. The preinstallation of monitoring circuits eliminates the need to change designs during the subsequent installation of the monitoring circuits. The programming of the signal lines required for monitoring is possible without changing the design and without resetting the states of the program logic on the respective programmable gate array, so that errors occurring in the program logic can be reproduced quickly. In combination with known techniques such as Virtual JTAG, the method can be carried out without changing the hardware of the computer system, for example, by installing JTAG cables between the programmable gate arrays, even by remote access to the computer system, for example, via a virtual private network (VPN) or by sending a script that executes the method.

One option for the programming of the first signal line and the second signal line is partial reconfiguration. This is a method for the subsequent programming of program logic on a programmable gate array using still free resources without influencing or changing the design already present on the programmable gate array. All states of the program logic already present on the programmable gate array, for example, the states of registers, remain unchanged when the design is extended by partial reconfiguration, provided that the design extension is a pure addition without overwriting portions of the original design. Partial reconfiguration can even be carried out at runtime of the program logic programmed on the programmable gate array.

The following method steps are proposed for the definition and programming of a signal line which is suitable for programming by partial reconfiguration in an existing design of a programmable gate array:

First, the netlist of the programmable gate array is expanded by the signal line and the existing design of the programmable gate array is locked. Such locking is to be understood to mean that a compiler, set up to create a design of a programmable gate array on the basis of a netlist, is presented with an already existing design, with the requirement that the existing design is retained when a new design is created. The compiler should therefore create the new design such that the new design comprises the existing design as a subset. Compilers with such a function for design locking are known in the state of the art.

In the context of the method of the invention, the existing design with the logic circuit and the monitoring circuit, communicatively isolated from the logic circuit, for example, the first logic circuit with the first monitoring circuit or the second logic circuit with the second monitoring circuit, is therefore locked.

A new design is subsequently created based on the netlist extended by the signal line and taking into account the locked design. The compiler is thus forced to plan the spatial course of the signal line using resources still available in the existing design such that the existing, locked design, in particular the logic circuit, remains unchanged.

Subsequently, the signal line is identified by forming the difference between the new design and the locked design and the identified signal line is programmed in the programmable gate array by partial reconfiguration.

At least the first signal line and the second signal line are programmed using the method steps described above. Of course, further signal lines can also be programmed in the same way either in the first or second programmable gate array or in further programmable gate arrays of the computer system.

The first monitoring circuit advantageously comprises a first external trigger signal input and the second monitoring circuit a second external trigger signal input, and the method comprises the method steps of applying the first external trigger signal input to a signal input pin of the first programmable gate array when programming the first monitoring circuit and applying the second external trigger signal input to a second signal input pin of the second programmable gate array when programming the second monitoring circuit, wherein a trigger signal, carried outside the first or second programmable gate array via a bus or a signal line of the computer system, can be applied to both signal input pins.

Furthermore, the first monitoring circuit advantageously comprises a first internal trigger signal input, to which a trigger signal from the first logic circuit can be applied by means of a trigger signal line, which is part of the design of the first programmable gate array, and the method comprises the method step of setting up the first internal trigger signal input as the first trigger signal input by programming a first trigger signal line, which applies a signal from the first logic circuit to the first internal trigger signal input, in the first programmable gate array without changing the first logic circuit.

The first trigger signal line is particularly advantageously programmed in the same way as the first signal line and the second signal line by partial reconfiguration.

In this embodiment, the first monitoring circuit reads out and stores the first signal value, therefore, as a result of a trigger event taking place within the first programmable gate array in the first logic circuit. In principle, the trigger signal line can be applied to any signal transmitted within the first logic circuit, so that a large number of possible events within the first program logic can be considered as a trigger event for the first trigger signal. The first trigger signal can be generated, for example, by adopting a certain state of a state machine implemented in the first logic circuit, by an edge of a signal, a change in the value of a variable parameter in the program logic of the first logic circuit, the truth of a mathematical comparison of a variable parameter with a certain value, the truth of a logical connection of at least two mathematical comparisons of a variable parameter with a specific value in each case, or the truth of a logical connection of at least two of the events listed above.

If, in the embodiment described last, the generation of the first trigger signal by an event in the first logic circuit is discussed, then a trigger signal is of course not to be understood as any signal present at a trigger signal input. Because, for example, the first logic circuit is not changed according to the invention, the logic for detecting the event must be implemented in the first monitoring circuit. Therefore, "a signal" must necessarily be permanently present at the first trigger signal input. For example, if the edge of a signal is to generate the trigger signal, in order to monitor the signal in question, a signal must then necessarily be permanently present at the trigger signal input, but only when a change in signal from low to high or vice versa causes the signal present to be interpreted as a trigger signal.

Accordingly, it is advantageous if at least the first monitoring circuit, in particular each monitoring circuit programmed on a programmable gate array of the computer system, is configurable, and the method comprises the additional method step of configuring the first monitoring circuit, in particular by remote access to the computer system, such that the first monitoring circuit interprets a signal, present at the first trigger signal input, as the first trigger signal when one of the previously enumerated events occurs. A configuration process of a monitoring circuit can occur, for example, by setting registers within the monitoring circuit, wherein the state of the registers defines a functionality of the monitoring circuit. A monitoring circuit can also be designed as a soft core, therefore, as a processor programmed into a programmable gate array, and the configuration process is carried out by loading a program logic, defined by machine commands, into the monitoring circuit.

The first monitoring circuit particularly advantageously comprises a first trigger signal output and can be set up or is set up to generate the second trigger signal as a result of the first trigger signal present at the first trigger signal input and to output it via the first trigger signal output. In this embodiment, applying the first trigger signal output to a signal output pin of the first programmable gate array, which is connected to the second trigger signal input via a bus or a signal line of the computer system, is provided as a further method step when programming the first monitoring circuit.

In this embodiment of the method, therefore, not only does the reading out and storing of the first signal value occur as a result of the first trigger signal, but also indirectly of the second signal value, because only this causes the second trigger signal to be generated. In combination with the above-described setup of the first internal trigger signal input as the first trigger signal input, it is possible in this way, due to a trigger event taking place within the first logic circuit, to cause signal values to be read out and stored synchronously in time in a plurality of programmable gate arrays of the computer system, at least in the first and second programmable gate array.

Due to the high clocking of modern programmable gate arrays, good synchronization of the readout processes of the first signal value and the second signal value is fundamentally advantageous in order to be able to relate the first and second signal value in a meaningful way. In some application cases of the method, even the delay in reading out the second signal value, caused by the signal propagation time of the second trigger signal, can be problematic. If a global system time, which both the first and second programmable gate array are set up to read out, is defined in the computer system, then this delay can be eliminated.

For this purpose, the first monitoring circuit is advantageously set up to determine, as a result of the first trigger signal present at the first trigger signal input, a future point in time of the global system time, whose time interval from the present corresponds at least to the signal propagation time of the second trigger signal to the second trigger signal input, and to generate a second trigger signal from which the future point in time can be read out. The second monitoring circuit is set up to read out the point in time from the second trigger signal. The first monitoring circuit is set up to read out and store the first signal value of the first signal, present at the future point in time at the first signal input, and the second monitoring circuit is set up to read out and store the second signal value of the second signal, present at the future point in time at the second signal input.

Particularly advantageously, both the first and second programmable gate array each have access to a local clock that is synchronized with the global system time. The offset of the readout times of the first signal value and of the second signal value is then essentially limited to the rate difference of both local clocks. In combination with methods known from the state of the art for synchronizing local clocks, the offset can be reduced to less than 100 nanoseconds in this way.

If, in addition to the first and second programmable gate array, further programmable gate arrays are integrated into the method, which are programmed in the same way as the first programmable gate array with monitoring circuits and, in addition to the second programmable gate array, are to read out signal values synchronously, then the time interval between the future point in time and the present should correspond at least to the signal propagation time of the second trigger signal to the programmable gate array furthest away from the first programmable gate array with regard to the signal propagation time of the second trigger signal. Without limiting the generality, this means that advantageously the signal propagation time of the second trigger signal to none of the signal input pins in one of the further programmable gate arrays is greater than the signal propagation time to the second trigger signal input.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
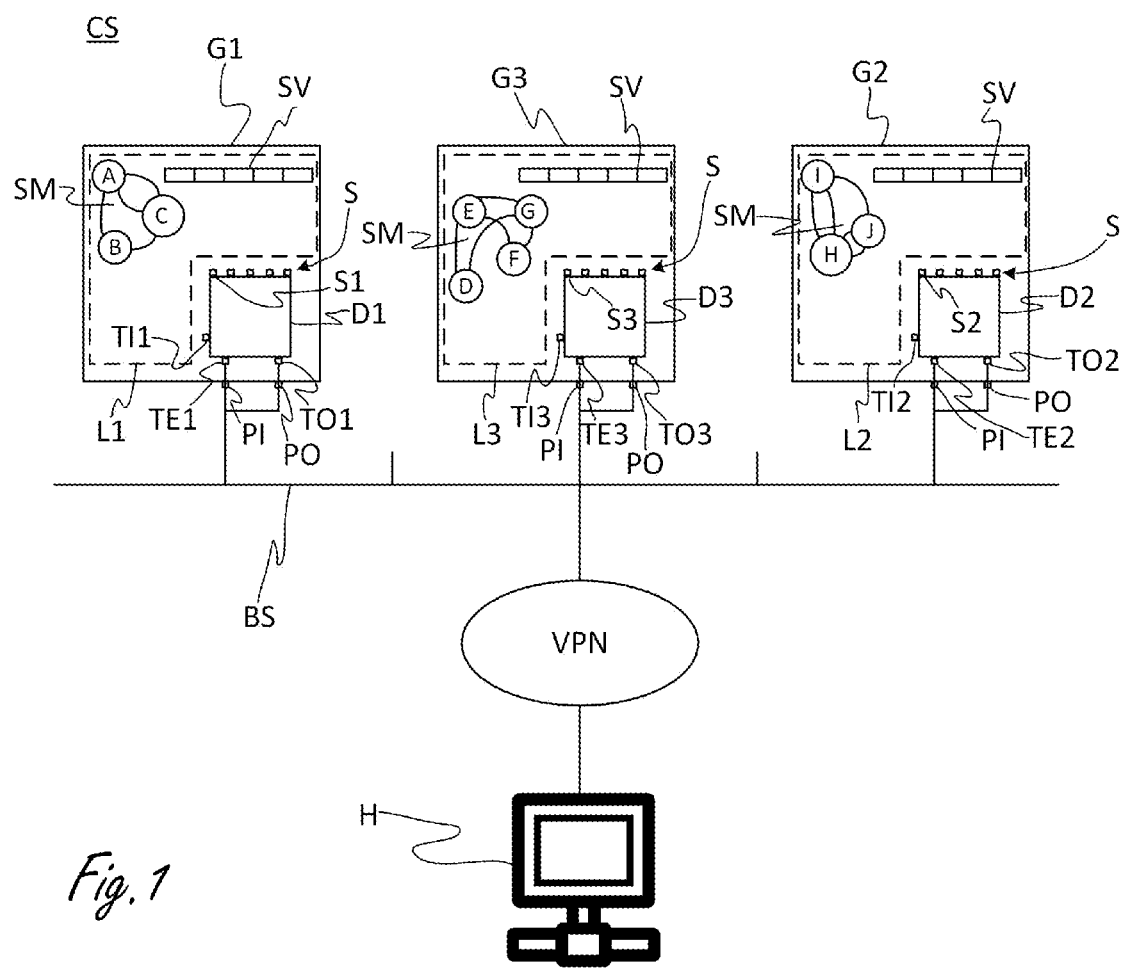
FIG. 1 shows a schematic representation of a distributed computer system with programmable gate arrays.

The illustration in FIG. 1 shows a computer system CS with distributed programmable gate arrays which are communicatively interconnected by a bus BS of computer system CS. For the sake of clarity, only a first programmable gate array G1, a second programmable gate array G2, and a third programmable gate array G3 are shown. A real computer system may include a plurality of programmable gate arrays that are mounted on different components of the computer system and are each either programmable by an end user or, inaccessible to an end user, are preprogrammed for specific tasks.

A first logic circuit L1 and a first monitoring circuit D1 are programmed on first programmable gate array G1, a second logic circuit L2 and a second monitoring circuit D2 on second programmable gate array G2, and a third logic circuit L3 and a third monitoring circuit D3 on third programmable gate array G3. Each of the illustrated logic circuits L1, L2, L3 comprises a state machine SM implemented in the respective logic circuit and a state vector SV from which the current state of state machine SM can be read.

A configurable first monitoring circuit D1 is also programmed on first programmable gate array G1; it comprises a first internal trigger signal input TI1, a first external trigger signal input TE1, a first trigger signal output TO1, and a first signal input S1. First external trigger signal input TE1 is located at a first signal input pin PI of first programmable gate array G1 and is connected via this pin to bus BS. First trigger signal output TO1 is located at a signal output pin PO of the first programmable gate array G1 and is connected via this pin to bus BS. First monitoring circuit D1 is communicatively isolated from first logic circuit L1; i.e., no signal lines or trigger signal lines are laid between first logic circuit L1 and first monitoring circuit D1, and there is no possibility of exchanging signals between first logic circuit L1 and first monitoring circuit D1. The monitoring circuits in addition comprise further signal inputs S, to which signals from logic circuits L1, L2, L3 can be applied according to the invention.

A configurable second monitoring circuit D2, communicatively isolated from second logic circuit L2, is programmed on second programmable gate array G2; it has a second signal input S2, a second internal trigger signal input TI2, a second trigger signal output TO2, which is located at signal output pin PO and is connected via this pin to bus BS, and a second external trigger signal input TE2, which is located at a signal input pin PI of second programmable gate array G2. A configurable third monitoring circuit D3, communicatively isolated from third logic circuit L3, is programmed on third programmable gate array G3; it has a third signal input S3, a third internal trigger signal input TI3, a third trigger signal output TO3, which is located at signal output pin PO and is connected via it to bus BS, and a third external trigger signal input TE3, which is located at a signal input pin PI of third programmable gate array G3. Both second monitoring circuit D2 and third monitoring circuit D3 are designed identical to first monitoring circuit D1.

Logic circuits L1, L2, L3 define the actual functionality of the respective programmable gate array G1, G2, G3 during normal operation of computer system CS. Monitoring circuits D1, D2, D3 are not used in normal operation, but only for troubleshooting after an error has been detected in the program logic of the computer system, therefore, the entirety of all program logics installed on different components of the computer system and defining the functionality of the computer system as a whole. If programmable gate arrays G1, G2, G3 are preprogrammed inaccessible for an end user, the illustration in FIG. 1 corresponds to a delivery state of computer system CS. If at least one of the programmable gate arrays can be programmed by the end user himself, it must be ensured, for example, by means of a correspondingly designed programming software available to the end user, that a monitoring circuit D1, D2, D3 is always also programmed on the programmable gate array whenever a programmable gate array G1, G2, G3 is reprogrammed.

A host computer H is connected to bus BS of computer system CS via a suitable interface, configured by way of example as a virtual private network (VPN) in the figure, in order to carry out the method steps explained below after an error has been detected in the program logic of computer system CS. In particular, computer system CS and host computer H are set up such that the configuration of monitoring circuits D1, D2, D3 and the programming of signal lines SI1 and trigger signal lines TS1 can be carried out on the programmable gate arrays by means of host computer H.

Figure 2:
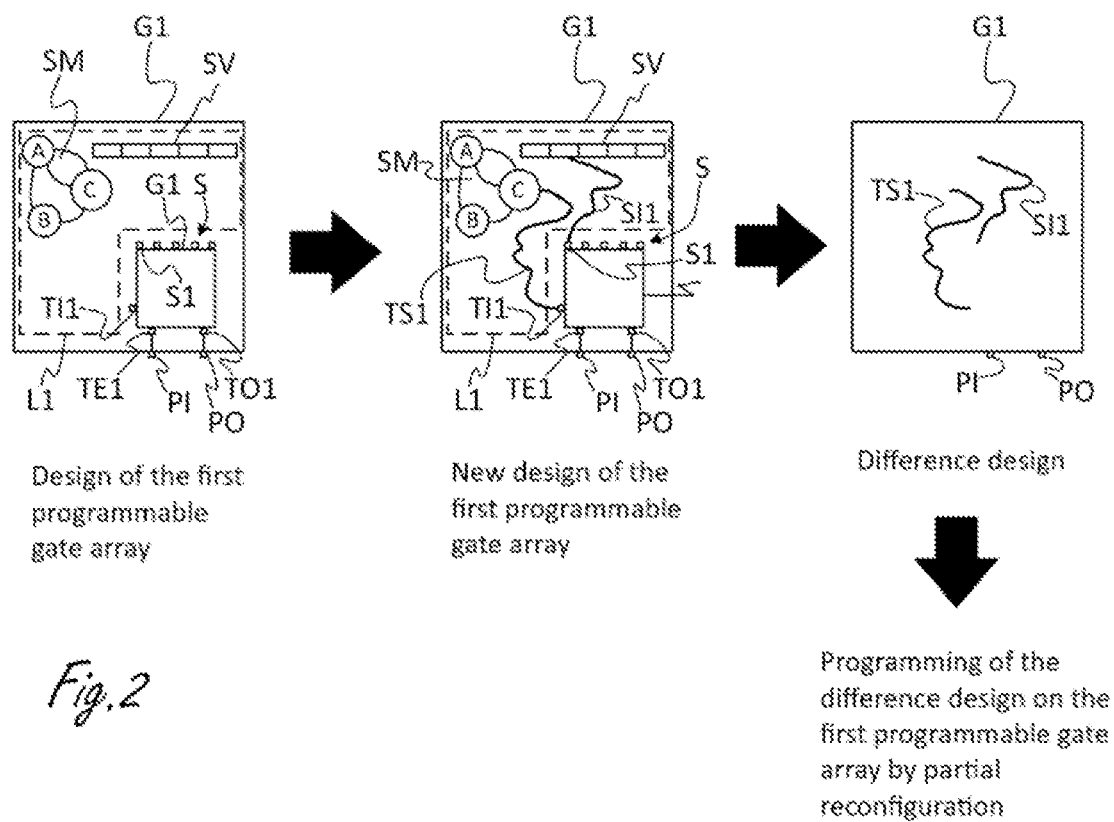
FIG. 2 shows a sequence of intermediate steps for programming signal lines and internal trigger signal lines on a programmable gate array.

The diagram in FIG. 2 illustrates by way of example an implementation of a first signal line SI1 and a first trigger signal line TS1 for first programmable gate array G1. Starting from the design of first programmable gate array G1, which at this point in time comprises first logic circuit L1 and monitoring circuit D1, which is communicatively isolated from it, the netlist of the design of first programmable gate array G1 is expanded by a first signal line SI1 and a first trigger signal line TS1. Using a suitable compiler, the expanded netlist is translated into a new design of first programmable gate array G1. Before the new design is created, however, the design of first programmable gate array G1 is locked; i.e., the compiler is informed that when the new design is created, all features of the original design must be retained, so that the new design differs from the original design solely by the presence of the lines added in the expanded netlist, specifically first signal line SI1 and first trigger signal line TS1. The compiler is thereby forced, when the lines added to the design of first programmable gate array G1 are placed, to access only free resources of first programmable gate array G1 that are unused in the design of first programmable gate array G1.

To identify the lines added in the new design, a "difference design" is created by determining the difference between the new design and the now locked design and only comprises the elements of the new design that are not present in the locked design, therefore, only the newly added lines, specifically first signal line SI1 and first trigger signal line TS1. The difference design is programmed on first programmable gate array G1 by means of partial reconfiguration, wherein the design of first programmable gate array G1 otherwise remains unchanged, including all states in the program logic of first logic circuit L1. The programming of the difference design by partial reconfiguration can even be done during the operation of computer system CS, including first programmable gate array G1.

Compilers with the technical functionalities necessary for carrying out the method steps previously explained in connection with FIG. 2, in particular for locking a design, for forming a difference design and for partial reconfiguration, are available in the state of the art.

Figure 3:
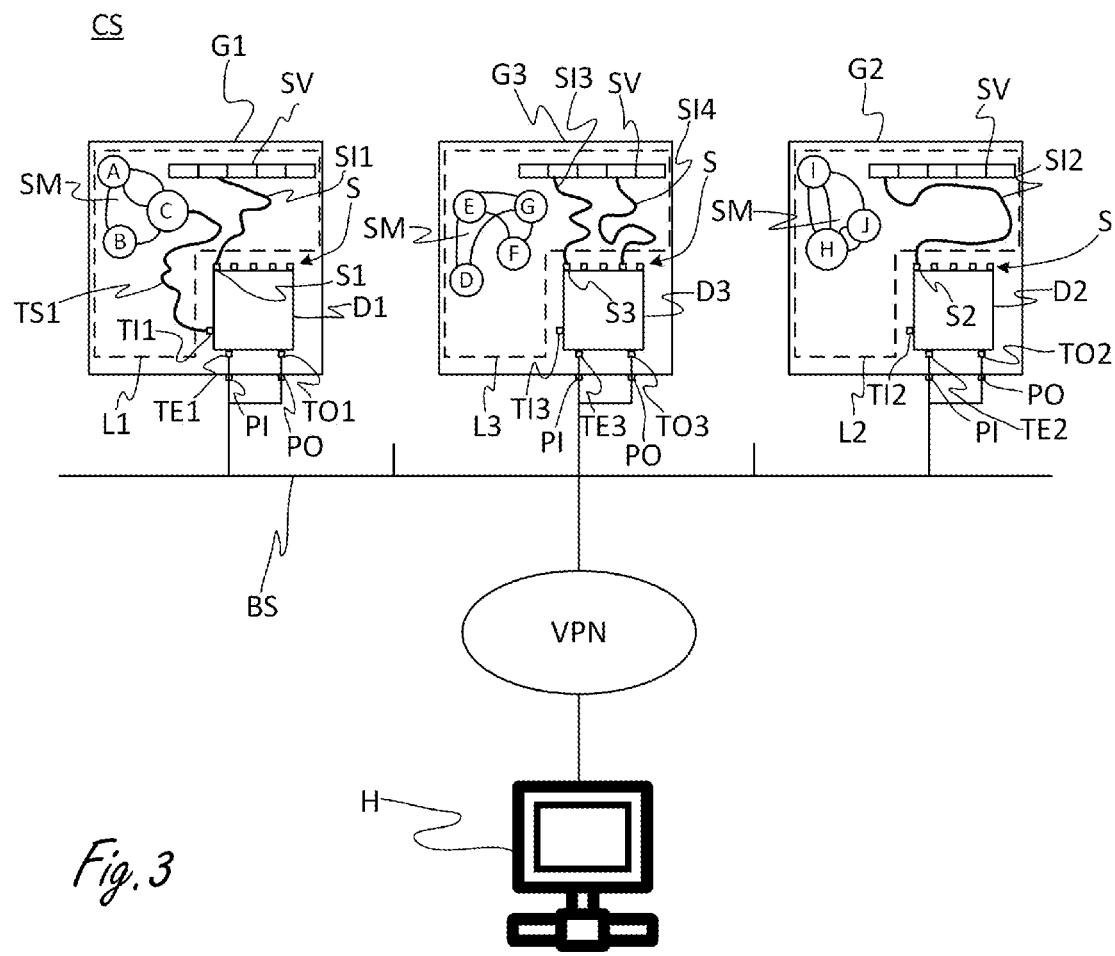
FIG. 3 shows the distributed computer system for troubleshooting set up according to the invention.

In the same way as described above using the example of first programmable gate array G1, signal lines and/or trigger signal lines are also programmed on further programmable gate arrays of computer system CS as required. The correspondingly set-up computer system CS is shown in the illustration in FIG. 3. The design of first programmable gate array G1 is expanded by first signal line SI1 and first trigger signal line TS1. The design of second programmable gate array G2 is expanded by a second signal line SI2, and the design of third programmable gate array G3 is expanded by a third signal line SI3 and a fourth signal line SI4, which is located at a further signal input S.

First trigger signal line TS1 applies a signal from state machine SM in first logic circuit L1 to first internal trigger signal input TI1, and first monitoring circuit D1 is set up, by means of suitable software installed on host computer H, to interpret the adopting of a state C of state machine SM as the first trigger signal. First signal line SI1 applies a further signal from first logic circuit L1 to first signal input S1 such that first monitoring circuit D1 can read out a value from state vector SV in first logic circuit L1 by means of first signal line SI1. First monitoring circuit D1 is configured by means of the software on host computer H such that the presence of the first trigger signal causes first monitoring circuit D1 first to read out and store a value from state vector SV in first logic circuit L1 as the first signal value, and second, to generate a second trigger signal and to output it via first trigger signal output TO1, so that the second trigger signal is fed via bus BS to second external trigger signal input TE2 and to third external trigger signal input TE3.

Second monitoring circuit D2 is configured by means of the software on host computer H such that the presence of the second trigger signal, generated by first monitoring circuit D1, at second external trigger signal input TE2 causes second monitoring circuit D2 to read out and store a value from state vector SV as a second signal value in second logic circuit L2. Third monitoring circuit D3 is set up by means of the software on host computer H such that the presence of the second trigger signal at third external trigger signal input TE3 causes third monitoring circuit D3 to read out and store a value from state vector SV as a third signal value and a further value from state vector SV in third logic circuit L3 as a fourth signal value.

In order to optimize the synchronicity of the readout processes of the signal values, first programmable gate array G1, second programmable gate array G2, and third programmable gate array G3 each have access to a global system time of computer system CS. A system time, which is determined by first monitoring circuit D1 and lies in the future at the time of the readout of the first signal value, is readable from the second trigger signal and is selected such that the signal propagation time of the second trigger signal to second external trigger signal input TE2, to third external trigger signal input TE3, and to all external trigger signal inputs of possible further network participants of computer system CS, which reads in the second trigger signal, is not greater than the time interval of the system time readable from the second trigger signal at the time the first signal value is read out. Second monitoring circuit D2 and third monitoring circuit D3 are each set up to read out the system time stored in the second trigger signal and to read out and store the signal values of the signals present at the corresponding system time at second signal input S2, at third signal input S3, and at fourth signal input S4.

By means of host computer H, the first, second, third, and fourth signal values can subsequently be read out, as well as possible further signal values detected according to the invention by participants of computer system CS, not shown in the figures, in order to relate the signal values to the event triggering the first trigger signal for analyzing an error in the program logic of computer system CS. The method of the invention can be repeated as often as desired in order to program new signal lines SI1, SI2, SI3, SI4 and/or trigger signal lines TS1 on programmable gate arrays G1, G2, G3 of computer system CS.

What is claimed is:

1. A method for troubleshooting the program logic of a computer system, which comprises at least one first programmable gate array and a second programmable gate array, the method comprising:

programming a first logic circuit on the first programmable gate array;

programming a second logic circuit on the second programmable gate array;

programming a first monitoring circuit, which is communicatively isolated from the first logic circuit and which comprises a first signal input and a first trigger signal input and is set up to read out and store a signal value of a signal, present at the first signal input, as a result of a trigger signal present at the first trigger signal input, on the first programmable gate array;

programming a second monitoring circuit, which is communicatively isolated from the second logic circuit and which comprises a second signal input and a second trigger signal input and is set up to read out and store a signal value of a signal, present at the second signal input, as a result of a trigger signal, present at the second trigger signal input, on the second programmable gate array;

programming a first signal line, which applies a signal from the first logic circuit to the first signal input, in the first programmable gate array without changing the first logic circuit;

programming a second signal line, which applies a signal from the second logic circuit to the second signal input, in the second programmable gate array without changing the second logic circuit;

generating a first trigger signal present at the first trigger signal input, which causes the first monitoring circuit to read out and store a first signal value from the first signal input; and generating a second trigger signal present at the second trigger signal input, which causes the second monitoring circuit to read out and store a second signal value from the second signal input synchronized in time with the reading out of the first signal value by the first monitoring circuit.

2. The method according to claim 1, further comprising: programming the first signal line and the second signal line by partial reconfiguration.

3. The method according to claim 2 further comprising for programming the first signal line:
- expanding the netlist of the first programmable gate array by the first signal line;
- locking the design of the first programmable gate array;
- creating a new design of the first programmable gate array, corresponding to the expanded netlist of the first programmable gate array, taking into account the locking of the design of the first programmable gate array;
- identifying the first signal line in the new design of the first programmable gate array by determining the difference between the new design of the first programmable gate array and the locked design of the first programmable gate array; and
- programming the first signal line in the first programmable gate array, and further comprising for programming the second signal line:
- expanding the netlist of the second programmable gate array by the second signal line;
- locking the design of the second programmable gate array;
- creating a new design of the second programmable gate array, corresponding to the expanded netlist of the second programmable gate array, taking into account the locking of the design of the first programmable gate array;
- identifying the second signal line in the new design of the second programmable gate array by determining the difference between the new design of the second programmable gate array and the locked design of the second programmable gate array; and
- programming the second signal line in the second programmable gate array.

4. The method according to claim 1, wherein the first monitoring circuit comprises a first external trigger signal input, wherein the second monitoring circuit comprises a second external trigger signal input, wherein the first monitoring circuit comprises a first internal trigger signal input to which a trigger signal from the first logic circuit is applied via a trigger signal line, which is part of the design of the first programmable gate array, having the method steps:
- applying the first external trigger signal input to a signal input pin of the first programmable gate array to which a trigger signal, carried outside the first programmable gate array via a bus or a signal line of the computer system is applicable, when programming the first monitoring circuit;
- applying the second external trigger signal input on a signal input pin of the second programmable gate array to which a trigger signal, carried outside the second programmable gate array via a bus or a signal line of the computer system is applicable, when programming the second monitoring circuit; and
- setting up the first internal trigger signal input as the first trigger signal input by programming a first trigger signal line, which applies a signal from the first logic circuit to the first internal trigger signal input, in the first programmable gate array without changing the first logic circuit.

5. The method according to claim 4, further comprising: programming the first trigger signal line by partial reconfiguration.

6. The method according to claim 5 further comprising for programming the first trigger signal line:
- expanding the netlist of the first programmable gate array by the first trigger signal line;
- locking the design of the first programmable gate array;
- creating a new design of the first programmable gate array, corresponding to the expanded netlist of the first programmable gate array, taking into account the locking of the design of the first programmable gate array;
- identifying the first trigger signal line in the new design of the first programmable gate array by determining the difference between the new design of the first programmable gate array and the locked design of the first programmable gate array; and
- programming the first trigger signal line in the first programmable gate array.

7. The method according to claim 1, wherein the first monitoring circuit comprises a first trigger signal output, wherein the first monitoring circuit is set up to generate the second trigger signal as a result of the first trigger signal present at the first trigger signal input and to output it via the first trigger signal output, and further comprising:
- applying the first trigger signal output to a signal output pin of the first programmable gate array, which is connected to the second trigger signal input via a bus or a signal line of the computer system, when programming the first monitoring circuit.

8. The method according to claim 7, wherein a global system time is defined in the computer system and both the first monitoring circuit and the second monitoring circuit are set up to read out the global system time, wherein the first monitoring circuit is set up, as a result of the first trigger signal present at the first trigger signal input, to determine a future point in time of the global system time, whose time interval from the present corresponds at least to the signal propagation time of the second trigger signal to the second trigger signal input, wherein the first monitoring circuit is set up to generate a second trigger signal from which the point in time can be read out, wherein the second monitoring circuit is set up to read out the point in time from the second trigger signal, wherein the first monitoring circuit is set up to read out and store the first signal value of the first signal present at the point in time at the first signal input, and wherein the second monitoring circuit is set up to read out and store the second signal value of the second signal present at the point in time at the second signal input.

9. The method according to claim 8, wherein the computer system comprises, in addition to the first programmable gate array and the second programmable gate array, further programmable gate arrays, each of the further programmable gate arrays comprises a signal input pin which is connected to the first trigger signal output via a bus or a signal line of the computer system such that the second trigger signal is present at the respective signal input pin, and wherein a signal propagation time of the second trigger signal to any signal input pin in one of the further programmable gate arrays is not greater than a signal propagation time for the second trigger signal input.

10. The method according to claim 4, wherein the first trigger signal line is programmed such that one of the following events generates the first trigger signal:
- adopting of a certain state of a state machine implemented in the first logic circuit;
- an edge of a signal from the first logic circuit;
- a change in the value of a variable parameter in the program logic of the first logic circuit;

a truth of a mathematical comparison of a variable parameter in the program logic of the first logic circuit with a certain value;

a truth of a logical combination of at least two mathematical comparisons of a variable parameter in the program logic of the first logic circuit, each with a specific value; or a truth of a logical combination of at least two of the events listed above.

11. The method according to claim 1, wherein the programming of the first signal line and the second signal line is carried out by remote access to the computer system.

12. The method according to claim 1, further comprising: configuring the first monitoring circuit by remote access to the computer system such that the first monitoring circuit interprets a signal, present at the first trigger signal input as the first trigger signal when an event generates the first trigger signal.

\* \* \* \* \*